Patented Aug. 17, 1937

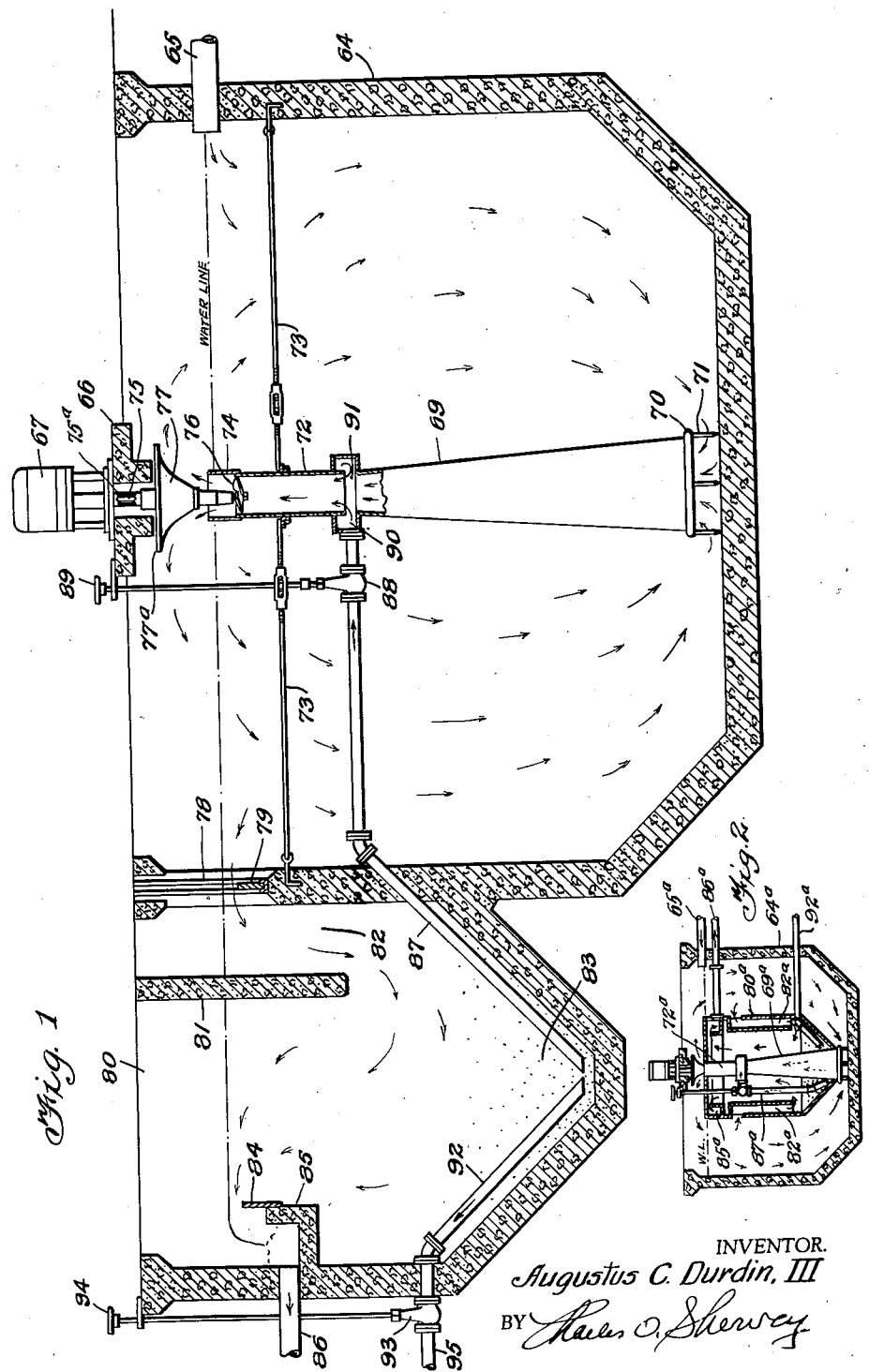

2,090,384

UNITED STATES PATENT OFFICE 2,090,384

SEWAGE TREATMENT APPARATUS

Augustus C. Durdin, III, Niles Center, Ill., assignor to Chicago Pump Company, Chicago, Ill., a corporation of Illinois Application December 18, 1935, Serial No. 55,110

5 Claims. (Cl. 210—8)

This invention relates to sewage treatment apparatus of the type that employs the activated sludge process.

One of the objects of this invention is to provide improved means for recirculating the contents of the tank in which sewage or industrial waste is received, whereby a greater abundance of oxygen is supplied the liquor to support the bacterial life therein.

A very desirable method of contacting the liquor with air is to throw the liquor some considerable distance through the air, and many attempts have been made to aerate the liquid in this manner with more or less success.

In accordance with the present invention, a column of liquor is propelled upwardly against a cone, as far as the impelling means will project it, whereupon the liquor is deflected outwardly by the cone in all radial directions, whereby the liquor may contact with the air through its flight and absorb abundant quantities of air before striking upon the liquor contained in the tank.

Another object of the invention is to provide, in connection with a settling tank, a sludge return pipe, in which sludge is returned to a rising column of liquor, without the aid of a pump or mechanical lifting device, other than the impeller which circulates the liquor.

Another object is to provide a sludge return pipe in connection with a settling tank or chamber, located either within or outside the aerating tank, for conveying sludge to the rising column of liquor without the aid of a pump or mechanical lifting mechanism, other than the impeller, which circulates the liquor.

Other objects and advantages will appear in the course of this specification, and with all of such objects and advantages in view, this invention consists in the several novel features hereinafter fully set forth and claimed.

The invention is clearly illustrated in the drawing accompanying this specification, in which:

Fig. 1 is a vertical, longitudinal section, through a sewage treatment apparatus, embodying a preferred form of the invention; and Fig. 2 is a vertical cross-section, illustrating a slight modification of the invention.

Referring to said drawing, and first to Fig. 1, the reference character 64 designates an aerating tank of suitable shape and dimensions, desirably having sloping walls connecting the side walls thereof with its bottom. An influent conduit 65 delivers sewage or other industrial waste to the tank near its upper end, and an effluent conduit 86 conducts the treated liquid away from a settling tanks or chamber 80, which communicates with the aerating tank through a passage 78 desirably controlled by gates, one of which is shown at 79. The gates may be interchangeable and of various heights, whereby a higher or lower one may be used to maintain a desired liquid level in the aerating tank.

Extending across the top of the aerating tank is a walk-way, or platform 66, upon which is mounted a motor 67 that is connected to a propeller or other suitable impeller 76, by an upright shaft 75 contained in a hanger pipe 75ª. Preferably the propeller 76 is of the screw propeller type and operates to project liquid upwardly.

Above the propeller is a deflecting cone 77, usually suspended by the hanger pipe. The deflecting cone is conical for some distance above its apex portion and the conical portion merges into an outwardly flaring, bell mouthed part 77ª of which the curved face merges into a horizontal or outturned marginal lip, the purpose of which will be presently explained.

Supported by legs 71, is an upright Venturi draft tube composed of the tapered portion 69 and the cylindrical throat portion 72. Guy rods 73 anchored in the side walls of the aerating tank are provided for aligning the draft tube. The cylindrical portion 72 of the draft tube has an adjustable cylindrical collar 74 at its upper end which may be raised or lowered to vary the height of discharge from the draft tube. The propeller 76 is located in the draft tube below the water line of the aerating tank and somewhat below the upper end of the draft tube.

The shape and location of the cone with respect to the propeller is of great importance, because unless the two are properly spaced apart the desired result is not obtained. It has been found that by locating the outwardly flaring bell-mouthed part 77ª of the cone at a point above the propeller, which exceeds the distance the propeller projects the liquid upwardly, the liquid striking the conical part of the cone continues along the outwardly flaring bell-mouthed part thereof and discharges therefrom in a substantially horizontal plane in all radial directions at considerable velocity, so that it travels through the air for a considerable distance through its trajectory curve before it falls upon and into the liquor contained in the aerating tank.

The exact location of the cone with respect to the propeller can be best ascertained by observing the peak of the upwardly projected column of liquor, and then lowering the apex portion of the cone into the column to a point where the liquor rises beyond its normal peak and flows upwardly along the surface of the cone to its greatest diameter, and then proceeds outwardly, radially, in all directions. I believe that it is due to the combined action of the surface tension between the cone and the liquor and the remaining inertia in the upwardly moving column of liquor that the liquor is caused to continue upward and outward along the bell-mouthed part of the cone and proceeds outwards radially in all directions for some considerable distance through its trajectory curve before it strikes the body of liquor in the tank. Through its flight, the relatively thin sheet of liquor absorbs abundant quantities of air from above and below and carries the air down with it into the liquor for a considerable distance. When the marginal lip of the bell-mouthed part of the cone is curved upwardly, the liquor follows the upturned tip and gains additional height before proceeding away from the cone.

With propellers and the ordinary cones now in use, the liquor is only thrown outward a foot or so, whereas with the present arrangement the liquor is thrown out five or six feet. This, of course, enables the liquor to contact with the air for a greater length of time and consequently it absorbs greater quantities of air.

In the operation of the circulating and aerating means, the motor 67 drives the propeller 76, which propels the liquor up against the cone, and the bell-mouthed part thereof deflects and directs the liquor outwardly through the air in all radial directions. The arrows in Fig. 1 indicate generally the direction of flow taken by the liquor through the tank and through the circulating and aerating means. Some of the liquor flows from the aerating tank into the settling tank 80 which provides a quiescent zone in which the sludge may settle out from the liquor and the treated liquor may rise and discharge through the effluent conduit 86.

The settling tank, illustrated in Fig. 1, has a baffle 81, which projects down from its upper end at a place adjacent the passage between the aerating tank and settling tank, thus providing an elongated passageway which leads down toward the lower end of the settling tank. The liquor flows slowly from the aerating tank to the settling tank and the turbulent condition that is present in the liquor is allowed to subside before it enters the settling tank.

At the discharge end of the settling tank, below the level of the liquor therein, is a trough 85 desirably provided with a vertically adjustable weir 84, over which the treated liquor flows into the trough 85 and discharges through the effluent conduit 86.

Sludge settles down from the liquor in the quiescent zone in the settling tank and some of this settled sludge is returned to the liquor which is being recirculated in the aerating tank. Desirably the bottom of the settling tank is of a hopper-like form, upon which the sludge may settle, and leading from the lower end thereof is a sludge return pipe 87, which leads to and discharges into the throat of the Venturi tube. The sludge return pipe 87 is controlled by a valve 88 which has a hand wheel 89 for operating the same located at the walk-way or platform 66. The valve provides means for controlling the amount of sludge returned to the recirculated liquor.

At the place where the sludge return pipe communicates with the Venturi tube, a collecting ring 90 is provided which surrounds the lower end of the section 72 of the Venturi tube and provides a restricted opening 91.

For removing the excess sludge from the settling tank, a sludge discharge pipe 92 is provided which leads upwardly from the bottom of the settling tank and out through the wall thereof, as at 95, where it is provided with a valve 93, having a hand wheel 94 desirably located at the top of the settling tank. The pipe 95 may run to a drying bed, a digestion tank or any other desirable place where the excess sludge may be dried or otherwise treated.

It is to be observed that with the use of a sludge return pipe leading from the settling tank to the Venturi tube, no pump or lifting mechanism, other than the impeller 76, is required to move the sludge from the settling tank to the rising column of liquor in the Venturi tube. When in operation the propeller 76 draws the liquor upward through the tube and lowers the pressure head in the collecting ring 90 considerably below that in the aerating tank at the same level. Owing to the differential pressure heads in the aerating tank and at the point of discharge of the sludge return pipe into the tube, the sludge is carried from the settling tank into the tube and passes upward with the rising column of liquor which presently is acted upon by the aerator.

In the modified form of the invention, illustrated in Fig. 2, the settling tank 80ᵃ is located within the aerating tank 64ᵃ and is provided with an inlet passage 82ᵃ adjacent its bottom that leads from the aerating tank. The hopper-like bottom of the settling tank is closed, and as in the preferred form, the sludge settles down from the liquor and lodges upon the bottom of the settling tank. The influent conduit 65ᵃ discharges into the aerating tank and the effluent conduit 86ᵃ leads from a trough 85ᵃ at the top of the settling tank and conducts the effluent away therefrom. The sludge return pipe 87ᵃ leads from the bottom of the settling tank to the throat of the Venturi tube 69ᵃ, 72ᵃ, as in the preferred form, and in all other respects the modified form is substantially the same in construction as the preferred form and operates in the same manner.

I claim as new and desire to secure by Letters Patent:

1. In combination, an aerating tank for containing the liquid to be treated, an upright open ended draft tube therein, with its upper end disposed above the level of the liquid in the tank, a propeller in said draft tube located adjacent the upper end thereof and below the level of the liquid in the tank, an upright driving shaft upon which the propeller is mounted, said propeller, when driven at normal speed acting to propel liquid upward beyond said draft tube to a predetermined height, a cone member located entirely above the draft tube and surrounding said shaft, said cone member having a relatively steep conical part disposed in the liquid column propelled by the propeller, with its base disposed approximately at the predetermined height at which the propeller propels the liquid column, and said conical part merging into a widely flaring bell mouth part disposed above the predetermined height to which the liquid column is propelled by the propeller, whereby, due to surface tension of the bell mouth part of the cone member on the liquid, the latter is caused to flow upward and outward along said bell mouth part and discharge laterally therefrom.

2. In combination, an aerating tank for containing the liquid to be treated, an upright open ended draft tube therein, with its upper end disposed above the level of the liquid in the tank, a propeller in said draft tube located adjacent the upper end thereof and below the level of the liquid in the tank, an upright driving shaft upon which the propeller is mounted, said propeller, when driven at normal speed acting to propel liquid upward beyond said draft tube to a predetermined height, a cone member located entirely above the draft tube and surrounding said shaft, said cone member having a relatively steep conical part disposed in the liquid column propelled by the propeller, with its base disposed approximately at the predetermined height at which the propeller propels the liquid column, the base of the conical part being of substantially the same diameter as the adjacent end of the draft tube, and said conical part merging into a widely flaring bell mouth part disposed above the predetermined height to which the liquid column is propelled by the propeller, whereby, due to surface tension of the bell mouth part of the cone member on the liquid, the latter is caused to flow upward and outward along said bell mouth part and discharge laterally therefrom.

3. Sewage treatment apparatus comprising in combination an aerating tank, an open ended Venturi draft tube therein, through which the contents of the aerating tank move upwardly, aerating means at the top of the draft tube having a screw propeller in the draft tube disposed below the level of the contents of the aerating tank and arranged to discharge liquor from the draft tube in an upward direction, whereby a lower pressure head is maintained in the throat of the draft tube than in the aerating tank, a settling tank having an inlet passage leading thereto from the aerating tank and having also an outlet and means to maintain substantially the same liquid level in the settling tank as that in the aerating tank, and a sludge return pipe unprovided with any means for lifting sludge therethrough, said sludge return pipe having an inlet adjacent the bottom of the settling tank, and an outlet opening into the throat of the Venturi draft tube whereby the higher pressure head in the aerating tank and settling tank, together with the high velocity of the liquor in the throat of the Venturi draft tube serve to lift substantial quantities of sludge from the settling tank through the sludge return pipe and discharge it into the Venturi draft tube.

4. Sewage treatment apparatus comprising in combination an aerating tank, an open ended Venturi draft tube therein, through which the contents of the aerating tank move upwardly, aerating means at the top of the draft tube having a screw propeller in the draft tube disposed below the level of the contents of the aerating tank and arranged to discharge liquor from the draft tube in an upward direction, whereby a lower pressure head is maintained in the throat of the draft tube than in the aerating tank, a settling tank within the aerating tank, said settling tank having an inlet passage leading thereto from the aerating tank and having also an outlet and means to maintain substantially the same liquid level in the settling tank as that in the aerating tank, and a sludge return pipe unprovided with any means for lifting sludge therethrough, said sludge return pipe having an inlet adjacent the bottom of the settling tank, and an outlet opening into the throat of the Venturi draft tube, whereby the higher pressure head in the aerating tank and settling tank, together with the high velocity of the liquor in the throat of the Venturi draft tube serve to lift substantial quantities of sludge from the settling tank through the sludge return pipe and discharge it into the Venturi draft tube.

5. Sewage treatment apparatus comprising in combination an aerating tank, an open ended Venturi draft tube therein, through which the contents of the aerating tank move upwardly, aerating means at the top of the draft tube having a screw propeller in the draft tube disposed below the level of the contents of the aerating tank and arranged to discharge liquor from the draft tube in an upward direction, whereby a lower pressure head is maintained in the throat of the draft tube than in the aerating tank, a settling tank outside the aerating tank, said settling tank having an inlet passage leading thereto from the aerating tank and having also an outlet and means to maintain substantially the same liquid level in the settling tank as that in the aerating tank, and a sludge return pipe unprovided with any means for lifting sludge therethrough, said sludge return pipe having an inlet adjacent the bottom of the settling tank, and an outlet opening into the throat of the Venturi draft tube, whereby the higher pressure head in the aerating tank and settling tank, together with the high velocity of the liquor in the throat of the Venturi draft tube serve to lift substantial quantities of sludge from the settling tank through the sludge return pipe and discharge it into the Venturi draft tube.

AUGUSTUS C. DURDIN, III.